US005363223A

United States Patent [19]

Beesley

[11] Patent Number: 5,363,223

[45] Date of Patent: Nov. 8, 1994

[54] ILLUMINATION OF DISPLAYS WITH CONTROL WHICH SWITCHES ILLUMINATOR IN RESPONSE TO CHANGES IN THE DISPLAY

[75] Inventor: Graham E. Beesley, Winchester, England

[73] Assignee: Shaye Communications Limited, Winchester, England

[21] Appl. No.: 982,721

[22] Filed: Nov. 27, 1992

[30] Foreign Application Priority Data

Nov. 28, 1991 [GB] United Kingdom ................. 9125331

[51] Int. Cl.[5] ...................... G02F 1/1335; G02F 1/133

[52] U.S. Cl. .......................................... 359/48; 359/86

[58] Field of Search .................................... 359/48, 86

[56] References Cited

U.S. PATENT DOCUMENTS

| | | | |
|---|---|---|---|
| 4,760,389 | 7/1988 | Aoki et al. | 359/48 |
| 4,868,459 | 9/1989 | Dennerlein et al. | 359/86 |
| 4,959,642 | 9/1990 | Sharples | 359/48 |
| 5,153,756 | 10/1992 | Ike | 359/86 |
| 5,157,525 | 10/1992 | Eaton et al. | 359/48 |
| 5,162,785 | 11/1992 | Fagard | 359/72 |
| 5,193,016 | 3/1993 | Cornuejols | 359/72 |
| 5,225,822 | 7/1993 | Shiraishi et al. | 359/48 |

FOREIGN PATENT DOCUMENTS

| | | | |
|---|---|---|---|
| 62-19835 | 1/1987 | Japan | 359/48 |
| 62-200332 | 9/1987 | Japan | 359/48 |
| 63-94228 | 4/1988 | Japan | 359/48 |
| 64-13119 | 6/1989 | Japan | 359/48 |
| 2-018520 | 1/1990 | Japan | 359/48 |
| 2-170126 | 6/1990 | Japan | 359/48 |
| 4-020924 | 1/1992 | Japan | 359/48 |
| 4-163523 | 6/1992 | Japan | 359/48 |

*Primary Examiner*—Anita P. Gross
*Attorney, Agent, or Firm*—Wenderoth, Lind & Ponack

[57] ABSTRACT

A problem arises in electronic equipment incorporating a display, such as an LCD display, which is not intrinsically illuminated. The present invention provides a controlled backlight for such displays, and is particularly useful in battery-powered equipment where power consumption must be kept to a minimum. The circuitry comprises a display 1 controlled via a conventional display driver 6 from other equipment (not shown) such as a microprocessor. Whenever the display is changed a signal is sent also to a timer circuit 7 which triggers, and passes a control signal to an electronic switch 4 which in turn passes power from a battery 3 to a lamp 2. The lamp 2 is arranged to illuminate the display 1. After a preset period, the timer circuit 7 sends a further control signal to the switch 4 to switch lamp 2 off.

20 Claims, 2 Drawing Sheets

ILLUMINATION OF DISPLAYS WITH CONTROL WHICH SWITCHES ILLUMINATOR IN RESPONSE TO CHANGES IN THE DISPLAY

This invention relates to illumination of displays, and is particularly directed to illumination of displays which are not intrinsically illuminated, such as LCD displays.

Displays are, by and large, meant to be readily seen and understood by a user. Many displays are intrinsically illuminated and do not usually need further illumination. However, some displays, the most obvious example being LCD displays, are not in themselves illuminated and, in the absence of a reasonably strong ambient light, need a background illumination if they are to be easily seen by a user. This invention concerns an improved means of providing such illumination, as well as providing additional illumination to displays whose inherent illumination is not sufficient to be easily seen.

A common means of providing such illumination is by way of a separate light, for example a backlight, which is switched on or off according to need. Where power consumption is not a problem such lighting may be permanently switched on; where power needs to be conserved, for example in battery-operated equipment, switch means may be provided to enable the user to manually switch on the light when needed either momentarily, or for a fixed duration.

In the present invention, a further improvement in battery consumption is achieved by providing means for enabling the light only as a result of a change of display. Preferably, once enabled, the light will remain enabled for a predetermined duration. It will be noted that the control of the light is independent of the source or cause of the display change—i.e. whether as a result of user actions or otherwise.

The invention finds particular application in cases where the power consumption is critical—for example portable equipment—and which may receive display changing information, such as messages, without any user interaction. User actions will also in general enable the display light via the same mechanism by virtue of the updating of the display caused by the users' input.

In order that the invention may be better understood, an embodiment thereof will now be described by way of example only, and with reference to the accompanying drawings in which.

Figure 1:
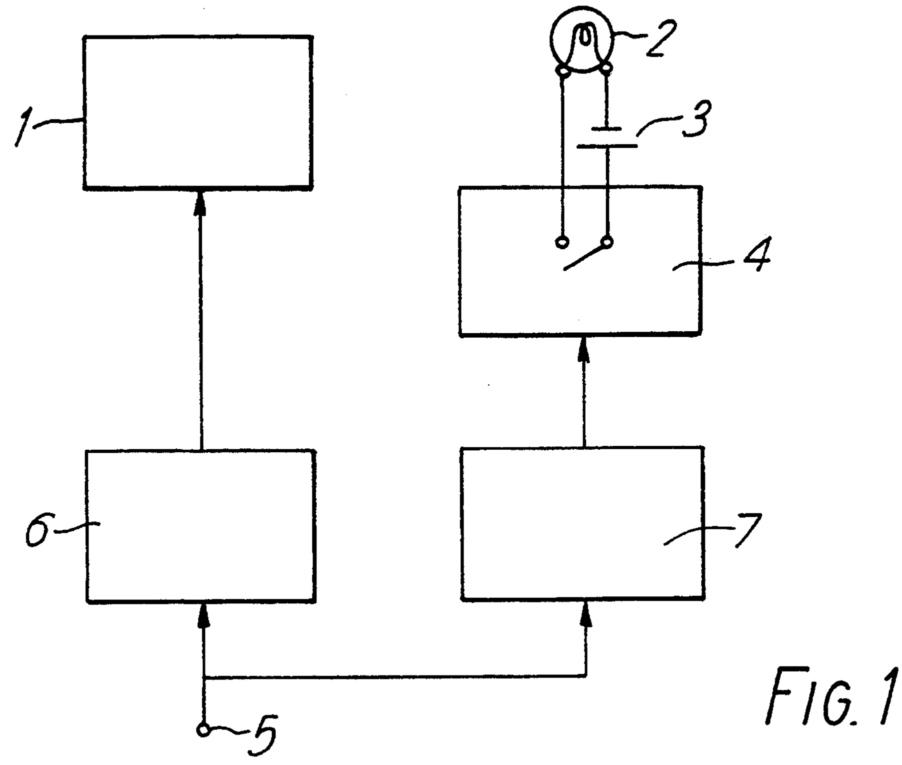
FIG. 1 is a block diagram of a display unit incorporating an illuminating light according to the invention.

Referring to FIG. 1, the display to be illuminated is represented by the reference 1. This will be a display which either has no inherent illumination, or one whose illumination needs boosting for ease of viewing. The lamp which carries out the necessary illumination is shown under reference 2, and may be any type of light source suitable for the purpose. The lamp is connected to a battery 3 via an electronic switch 4. The battery may be a dedicated battery, or it may be the main battery supplying power to the remaining circuits.

The display input signal is applied at a terminal 5, and is input to a display driver 6 which drives the display 1 in the usual manner. The input signal is also passed to a timer circuit 7 which triggers when any change is detected in the display input signal, and passes a control signal to the electronic switch 4 to close same and thus allow current to pass from the battery 3 to the lamp 2. The period for which the switch 4 is closed, and hence the lamp 2 illuminated, is set by the timer circuit 7. The period is set to an amount which is judged to be sufficient for the particular display, and the circumstances of use.

Figure 2:
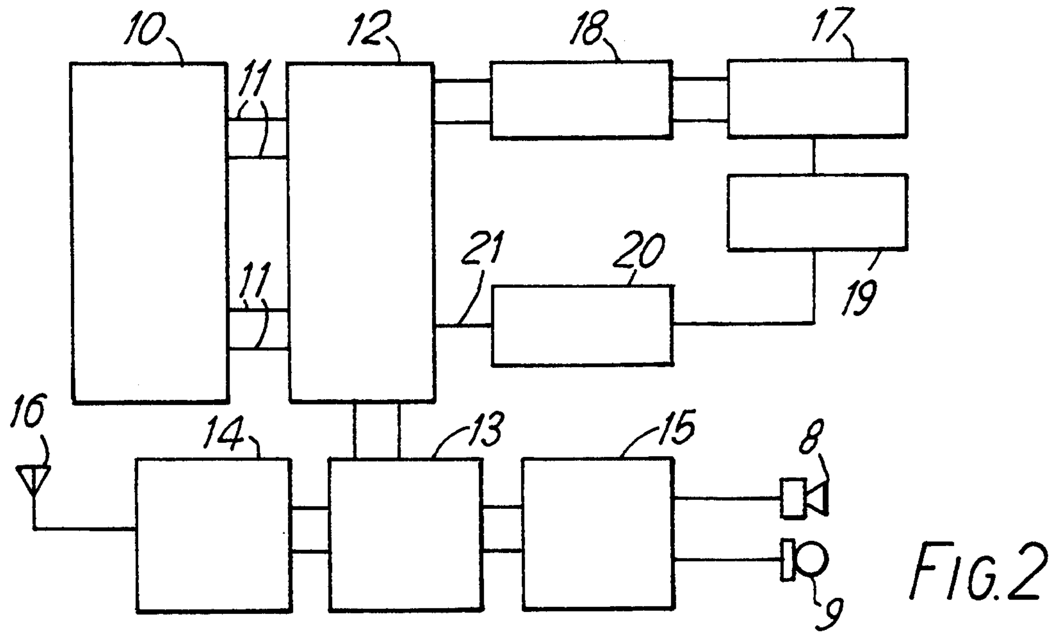
FIG. 2 is a view similar to FIG. 1, but showing the particular application of the invention to a cordless telephone.
Figure 3:
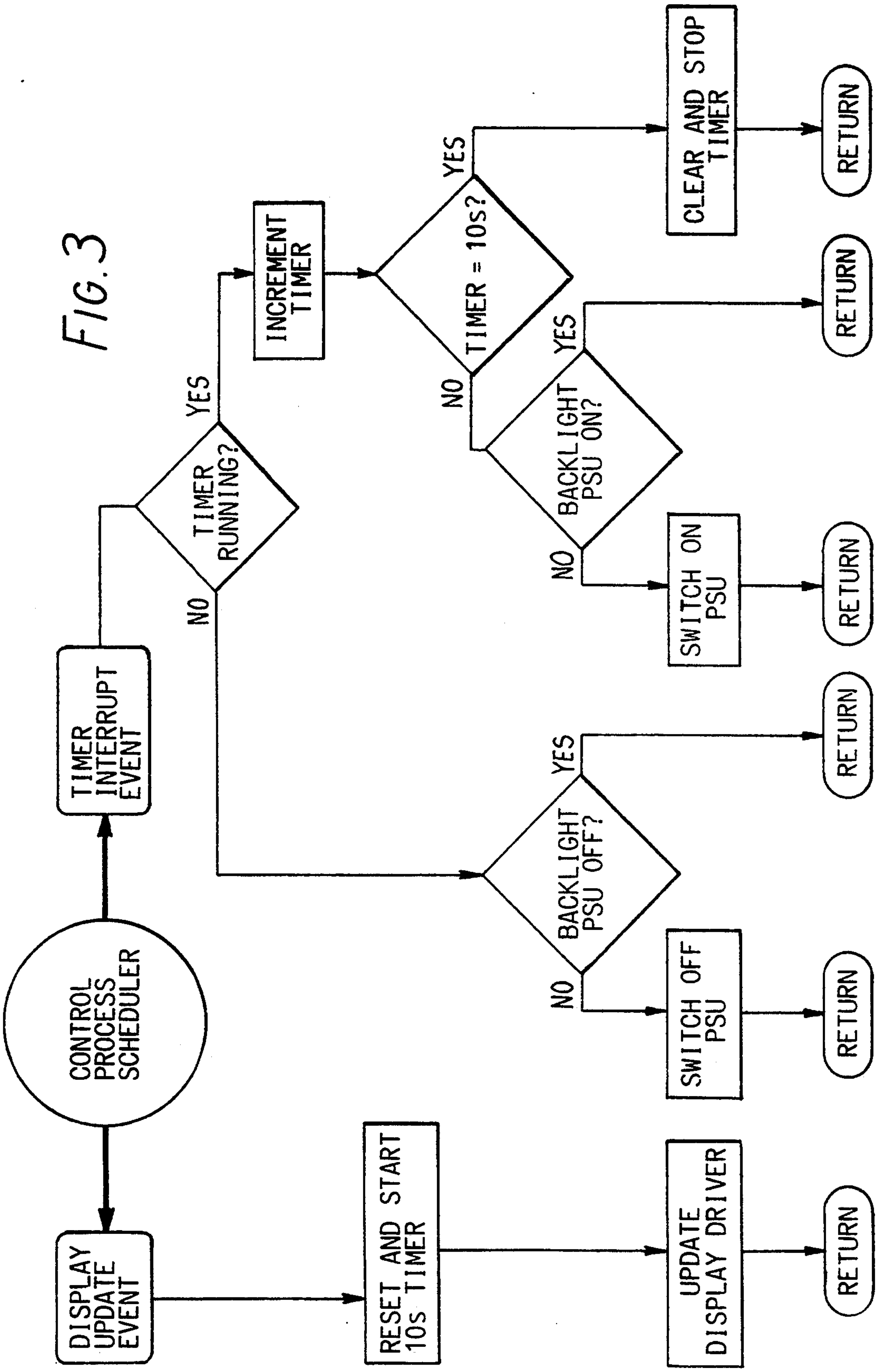
FIG. 3 is a diagram of the controlling logic within the microprocessor forming part of the cordless telephone of FIG. 2.

Referring now to FIGS. 2 and 3 there will be described the particular application of the present invention to a cordless telephone system. Such systems generally comprise one or more base units which are hard wired to the telephone network, and a plurality of portable units or handsets. The base units and the portable units each contain transceivers by which the portable units may communicate with the base units. FIG. 2 is a simplified block diagram of the circuitry of a typical portable unit forming part of such a system. The portable unit comprises an earpiece 8 and microphone 9 by which a user can exchange messages in the manner of a conventional telephone. A keypad matrix 10 is provided to enable the user to key in the numbers and/or functions that are required. The keypad matrix 10 communicates via parallel leads 11 with a microprocessor 12 which controls the operations of the portable unit in a manner which is known, and will not be explained further. Control is passed from the microprocessor to a conventional modem and control unit 13 which in turn controls a transceiver 14 and audio circuitry 15. The transceiver 14 deals with the transmission and reception, via an aerial 16, of the radio signals between the portable unit and the base unit (not shown). The audio circuitry 15 handles the signals to and from the earpiece 8 and the microphone 9. These operations are well known, and will not be described further.

The portable unit is equipped with an LCD display 17 which is fed in the usual manner from the microprocessor 12 via a conventional display driver 18. In order to illuminate the display 17, a display backlight 19 is provided in the manner described above with reference to FIG. 1. Power for the backlight 19 is taken from the system battery (not shown) via a switching power supply unit (PSU) 10. The power supply unit 20 is in turn controlled from the microprocessor via a control lead 21.

In operation, the backlight 19 is switched on whenever a display change occurs, and remains on for a preset period, in this case 10 seconds. Both display change detection and backlight timing are controlled from within the microprocessor 12 and FIG. 3 illustrates the logic which is used to effect the two functions. The diagram is self-explanatory and will not be explained in detail. The timer and the software-based control process scheduler both form part of the microprocessor 12. The microprocessor 12, in its role in controlling the normal functions of the portable unit, has many tasks to perform in addition to control of the backlight; thus the references to "Return" in FIG. 3 mean simply that the microprocessor 12 returns to its normal functions whilst periodically monitoring for an event effecting the backlight.

The above-described invention will find a variety of applications in portable equipment, particularly that which is of physically small size and therefore of limited battery capacity. The particular application which has been described, namely the illumination of the display in the handset of portable telephone equipment is but one example of the many applications to which the invention may be applied.

I claim:

1. Electronic equipment including a display and characterised by means for illuminating said display, and means controlling said illuminating means for switching on the illumination only as a result of the occurrence of a change in the display.

2. Electronic equipment as claimed in claim 1 wherein the display is not intrinsically illuminated.

3. Electronic equipment as claimed in claim 2 wherein the display is an LCD display.

4. Electronic equipment as claimed in any one of claims 1 to 3 wherein said controlling means comprises means for detecting the occurrence of a display change, and outputting a control signal as a result of such change, and switch means, controlled by said control signal, for switching said illuminating means on.

5. Electronic equipment as claimed in claim 4 wherein said detecting means forms part of a microprocessor which also controls the display itself.

6. Electronic equipment as claimed in claim 5 further comprising a timer for controlling the time for which said illuminating means is switched on.

7. Electronic equipment as claimed in claim 6, wherein said timer is controlled so as to commence timing upon switching on of the illuminating means, and to output a further control signal to said switch means after a preset period to switch said illuminating means off.

8. Electronic equipment as claimed in claim 7 wherein said timer forms part of said microprocessor.

9. Electronic equipment as claimed in claim 6 wherein said timer forms part of said microprocessor.

10. Electronic equipment as claimed in claim 9 which is battery powered.

11. Electronic equipment as claimed in claim 5, which is battery powered.

12. Electronic equipment as claimed in claim 4 further comprising a timer for controlling the time for which said illuminating means is switched on.

13. Electronic equipment as claimed in claim 12, wherein said timer is controlled so as to commence timing upon switching on of the illuminating means, and to output a further control signal to said switch means after a preset period to switch said illuminating means off.

14. Electronic equipment as claimed in claim 13 wherein said timer forms part of said microprocessor.

15. Electronic equipment as claimed in claim 4, which is battery powered.

16. Electronic equipment as claimed in any one of claims 1–3 further comprising a timer for controlling the time for which said illuminating means is switched on.

17. Electronic equipment as claimed in claim 16 wherein said timer is controlled so as to commence timing upon switching on of the illuminating means, and to output a further control signal to said switch means after a preset period to switch said illuminating means off.

18. Electronic equipment as claimed in claim 17 which is battery powered.

19. Electronic equipment as claimed in claim 16 which is battery powered.

20. Electronic equipment as claimed in any one of claims 1–3 which is battery powered.

* * * * *